Figure 1:
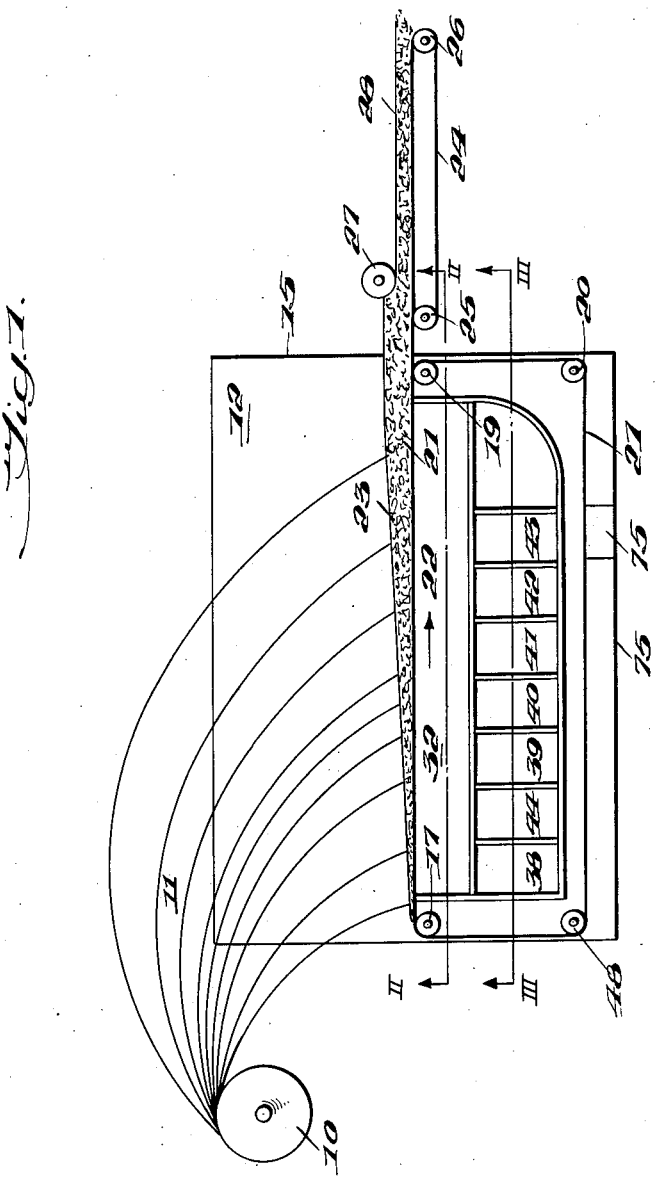

INVENTORS
BO I. ANDERBERG
SVEN OLOF KJELL-KJELL-BERGER

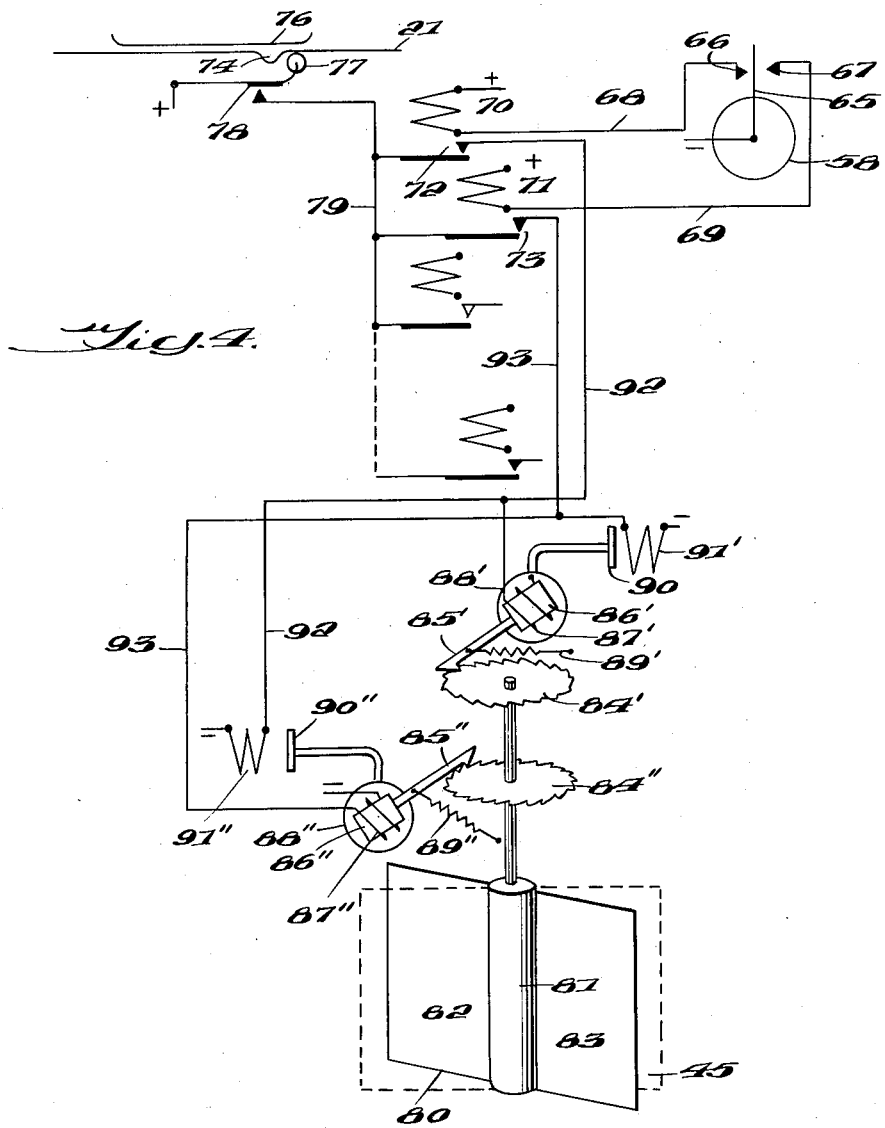

United States Patent Office 3,032,836
Patented May 8, 1962

3,032,836
APPARATUS FOR THE DISTRIBUTION OF MINERAL WOOL ON A BAND CONVEYOR
Bo I. Anderberg and Sven Olof Kjell Kjell-Berger, Skovde, Sweden, assignors, by mesne assignments, to Rockwool Aktiebolaget, Skovde, Sweden, a corporation of Sweden
Filed Oct. 13, 1959, Ser. No. 846,208
Claims priority, application Sweden Oct. 21, 1958
9 Claims. (Cl. 19—156)

In the production of mats and similar formations from mineral wool, e.g. rock-wool, glass-wool, slack-wool or the like, one used to proceed in such a way, that the material forming the wool was molten in an oven, suitable for the purpose, from which the melt was allowed freely to flow out into a fibration device, which may consist of either a spinning machine or a number of steam or air tubes. Several different kinds of fibration machines are known, and the present invention is not connected per se to the use of a given kind of such a machine. The essential matter is that in the fibration machine the mass molten in the oven is spun into a fine wool, the mineral wool.

The spun mineral wool thereafter is allowed to fall down onto a band conveyor, moving slowly and forming a mat, which is thereafter made subject to different continuous proceedings, e.g. pressing down to an even thickness, sewing between paper coverings or the like. The ready product is thereafter usually used as insulation means. Experience has now proved that the mat produced in this way has essentially different insulation properties in different places, distributed in one way or another along the length of the mat, and also along the width of the mat.

For avoiding the disconformity of the specific weight of the mat pro unit of length of the formed mat, one has already found reliable means, but, on the other side, it has proved very difficult to prevent disconformity in the consistency of the formed mat in the cross direction. The present invention is based upon certain investigations, which had for their purpose to state the reason for this non-conformable distribution of the deposited wool material in the cross direction of the formed mat.

One has usually arranged the conveyor in the form of a perforated band, preferably a network of metal thread net, and under this conveyor there has been arranged a very strong suction blower, which has sucked the air down on to the conveyor, when carrying with it the mineral wool. In order that the suction air shall be used as far as possible, one has further surrounded the space above the conveyor with a wall construction, so that a fully or partly closed channel is formed, in which the conveyor band forms the bottom. Dependent upon the circumstances in each separate case one could have the suction air to act below the conveyor band along all of its total length, or only along part of its length.

The investigations made have now proved that the wool has a distinct tendency to be deposited to a greater extent at the sides of the conveyor band than in its middle, the above mentioned, observed deposit of the wool, non-uniform in the cross direction thereby being created. The explanation of this is obviously that the streams of air are different at the sides and at the middle, possibly dependent upon the stream of air at the walls of the collector case being subject to a given frictional resistance against these walls, which in combination with the creation of eddies of air compress the air to a certain extent at the walls. As the air is the main conveyor means for the mineral wool, this will consequently deposit the wool differently at the central part of the conveyor band and at the sides.

In connection with attempts to overcome the disadvantage, represented by the non-uniform distribution of the deposited mineral wool, thus created, one has at the tests, which were made before this invention, amongst other things worked with dampers or shutters, which were provided immediately below the conveyor band in such a way that in given limited part or parts the wool has compulsorily been brought mainly to the middle of the conveyor band. This method has, however, not given the desired equality as to the distribution of the wool.

The present invention now refers to a method and an arrangement for providing a fully equal distribution of the deposited mineral wool on the conveyor band in its cross direction. According to a specifically advantageous form of execution of the invention the control of the means provided according to the invention takes place automatically, so that regard is also paid to such circumstances, not immediately visible at ocular sight, as variation in the tightness of the wool, how fine the threads are and the like, which can cause a readjustment of the control means, controlling the distribution in cross direction.

The automatic adjustment of these controlling means can take place in a plurality of different ways. Common to all of them is, however, that they are based upon an observation, which is basic for this part of the invention: The air resistance through the created wool mat is not, as one might be inclined to believe, dependent upon how strongly the wool has accidentally been compressed, as long as it has not been compressed into a homogeneous sheet. The air resistance through the mat is instead practically exactly proportionally dependent upon the weight of the mineral wool mass deposited pro unit of area. If, for instance, for one reason or another the mineral wool mass deposited on a given square meter should be doubled, the through stream resistance of the air through this square meter of the mineral wool mat is also doubled. This observation can be used for executing an automatic control of the above mentioned control means, for instance by measuring the pressure drop produced by the current of air through the mineral wool mat, or by measuring the weight of this mat on a given part of its length during the continuous movement of the mat over the measuring place. If one can assume that the specific weight of the formed mat is rather constant, one can also measure the thickness of the mat and derive from the measuring result an automatic control of the air current reactions.

The invention will be further described below in connection with the attached drawings, which show one form of execution of the invention. In the drawings FIG. 1 shows in a strongly schematic way a longitudinal section through the collection case of a fibration machine, indicated in the upper left corner of this figure, whereas FIGS. 2 and 3, respectively, show sections through the arrangement according to FIG. 1 along the lines II—II and III—III, respectively. FIG. 4 is a wiring diagram.

In FIG. 1 it is assumed that molten mineral has been poured down on to a roller in a fibration machine with a plurality of rotating rollers, the last one of which being shown at 10. As mentioned above, it is not of decisive importance to the invention how the fibration machine is arranged or how the fibration takes place. From the fibration machine in this case a cascade of mineral fibres 11 is thrown out by the centrifugal force, said fibres being collected by a collector case 12, limited by the side walls 13 and 14 and the end wall 15. The cascade of fibres is thereby sucked into the collector case by an air current, provided by a strong suction blower being connected to a suction conduit 16, FIG. 3. In the collector case a slowly movable conveyor is placed, consisting of the network 21, movable over four rollers 17, 18, 19 and 20, said network moving in the direction of the arrow 22.

Due thereto the created mineral wool, sucked into the collector case 12, will settle on the conveyor 21 as a mat of continuously increasing thickness 23. It is successively transferred during the continuous movement of the conveyor 21 to a second conveyor 24, which has also the character of a band conveyor and which moves with the same speed as the conveyor 21 over two rollers or wheels 25, 26. At a suitable place along the path of the conveyor 24 a pressure roller 27 may be provided for pressing down the mat to less thickness, as indicated at 28.

The before mentioned arrangement of parts is known. In this known arrangement it cannot be avoided, however, that a cross section through the formed mat, e.g. along the lines X—X in FIG. 2, will show a rather uneven thickness of the mineral wool mat.

Figure 2:
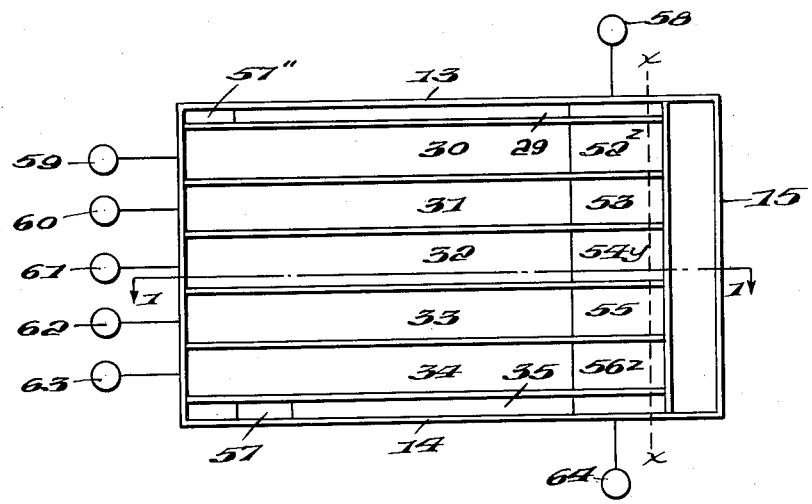

The present invention has for its purpose a method and an arrangement, by which the sensible disadvantage of such a non-uniform deposit of mineral wool can be avoided. This takes place by a space, applied under the proper collector case 12, being divided into compartments 29, 30, 31, 32, 33, 34 and 35 in the longitudinal direction, as indicated in FIG. 2. Assuming now, that FIG. 1 forms a section through the arrangement according to FIG. 2 along the line I—I, then obviously the partition visible in FIG. 1 will be formed by the compartment 32.

Figure 3:
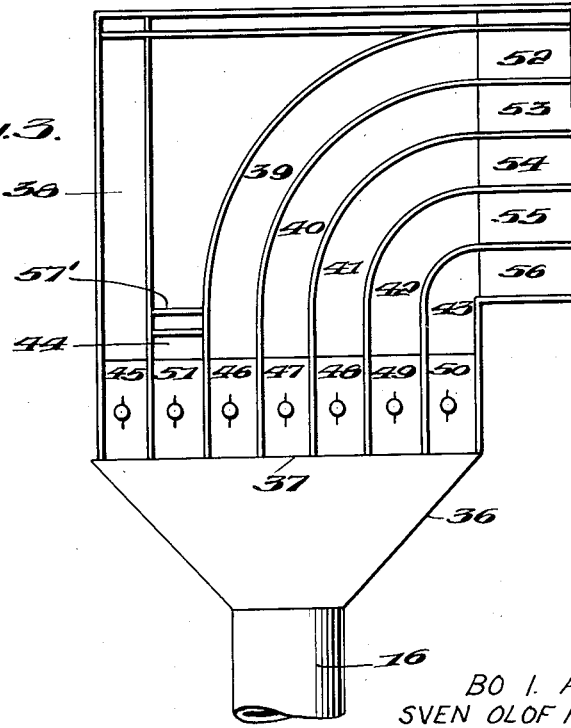

The connection between the compartments 29–35 now takes place by a system of channels, which are further explained in connection with FIG. 3. The suction conduit 16 from the suction blower is connected to a funnel-formed part 36, which is in its turn connected to the mouth plane 37 of seven different suction conduits 38, 39, 40, 41, 42, 43 and 44. Between the proper suction conduits 38–44 and the suction conduit funnel 37 there are provided seven damper chambers 45–51, each belonging to one suction conduit and each containing one damper, the function of which will be further described below.

The suction conduit 38 runs cross ways below all of the compartments 29–35 and is at its upper wall provided with an opening in the bottom of the compartment 29. The suction conduits 39–43 are bent approximately circularly sector-formed, so that their remote ends will be connected each to one circularly sector-formed chamber, through which they communicate with the compartments 30–34, viz. through openings 52–56. The suction conduit 44 is finally carried on to an opening 57′, through which it communicates with the second border compartment 35.

The dampers placed in the damper chambers 45–51 have the purpose of controlling the suction action through the different suction conduits and thereby also through the different partitions, so that a relatively greater quantity of spun mineral wool will be sucked down to the conveyor 21 above the compartments 29–35, where, during the earlier existing relations, the mineral wool mat would have been too thin or light, in order to secure in this way that the mineral wool mat shall obtain an evenly distributed volume weight over all of its width. As mentioned above, one has in connection with the present invention observed that the air resistance through the deposited mineral wool pro unit of area of the created mat is, mainly independent of how strongly the mat has been compressed, directly proportional to the deposited weight of mineral wool pro unit of area of the mat. When the question is to control the deposited weight of mineral wool pro unit of area of the mat, one can of course take steps in order to weigh certain parts of the mat or to measure the thickness of the mat at certain places, e.g. at the roller 27, but a very simple and reliable step for this purpose consists in measuring instead the vacuum below the outer atmospheric pressure in each of the compartments 29–35. If, for instance, too little mineral wool should be deposited on the conveyor above the compartment 29, this would result in a decreased air resistance through this part of the mat. The pressure drop through the mat would then also decrease, simultaneously as the pressure drop through the conduits to the compartment 29, the damper 45 included, would increase, and the pressure in the interior of the compartment 29 would rise and approach the pressure of the outer atmosphere.

For this purpose one has, according to an especially advantageous form of execution of the present invention, connected a manometric indication instrument to the end of each separate compartment 29–35, placed farthest away from the suction opening 51–57′. This indication instrument is fitted in such a way that it will close one of its contacts, if the pressure in the compartment is below the normal, and the other one of its contacts, if the pressure in the compartment is above the normal, but that no contact closing will be created, if the pressure in the compartment should be the normal one. This closing of a contact is used in a way, which will be described in connection with FIG. 4, for periodical readjustment of the dampers in the inlet conduits to the different suction conduits, so that an approximately equal vacuum will exist in all of the compartments 29–35. The seven manometric instruments are indicated 58–64.

FIG. 4 shows one of the manometric instruments 58. Its chassis and pointer are connected to the minus terminal of the available electric network. The pointer 65 thus serves as the one contact closing element, and when the instrument is moving in one direction, it will form contact with a counter contact 66, and when the instrument is moving in the other direction, it will form contact with a counter contact 67. The two counter contacts 66 and 67 are over conductors 68 and 69, respectively, in connection each with one relay 70 or 71, respectively, the contacts of said relays 72 and 73, respectively, carrying high tension current.

At equal distances there are provided on the above mentioned conveyor 21 in the form of an endless net band cams 74 for cooperation with a contact device 75, see FIG. 1. This contains the control means for the conveyor net in the form of a rail 76, see FIG. 4, and also a movable contact, which, by means of a looping pulley 77, touches a net band 21, and also a counter contact, provided to be closed by cooperation between a cam 74 and the pulley 77, so that contact is closed at 78. One terminal of the contact 78 is connected to the grounded minus terminal of the network, whereas the other terminal of the contact 78 is connected to a collector conduit 79 for controlling the seven dampers in the damper chambers 45–51. As the controlling arrangements are mutually shaped in the same way, it was found sufficient here only to describe the control arrangement for one of the dampers, viz. the damper 80 placed in the damper chamber 45.

The damper 80 consists of a cylindrical shaft 81, provided in the damper chamber 45 and geared at its upper and lower ends, and provided with two wings 82, 83, so formed that they can be brought mainly to shut off the communication through the suction air channel, in which the damper chamber 45 is contained. For controlling the damper 80 there are provided two step movement works, acting in different directions. Each of them contains one step movement disk 84′ or 84″, respectively, controlled each by means of its step hook 85′ or 85″, respectively. The step hooks 85′ and 85″ are connected with the armatures 86′ and 86″, respectively, of two suction magnets 87′ and 87″, respectively, which are mounted on turnable chassis plates 88′ and 88″, respectively. The chassis plates 88′ and 88″, respectively, are turnable in such a way that by the turning the step hooks 85′ and 85″, respectively, will be brought out of co-action with the step hook wheels 84′ and 84″, respectively, belonging thereto. The longitudinal movement of the step hooks 85′ and 85″, respectively, under influence of the suction magnets 87′ and 87″, respectively, as well as the turning of the chassis of these suction magnets are taking place against the action of a common spring 89′ and 89″, respectively. For causing the turning movement of the chassis 88′ and 88″, respectively, an armature 90′ and 90″, respectively, is provided under influence of magnets 91′ and 91″, respectively.

The contact 72 is by means of a conductor 92 connected to the winding of the suction magnet 87′ and the winding of the magnet 91″, and in a similar way the contact 73 is by means of a conductor 93 connected to the winding of the suction magnet 87″ and to the winding of the magnet 91′.

The arrangement functions in the following way: It is assumed that, when all of the system is put into operation, all of the dampers of the type 80, situated one in each of the seven damper chambers 45–51, have assumed a mean position. One can then assume that some of them are, as a matter of fact, in a position, by means of which too much suction air will be fed to the compartments 29–35, respectively, whereas others of them are in a position, due to which too little air is fed to the partitions concerned. It is further assumed that during the nearest following production of mineral wool mat during deposit of mineral wool on the conveyor 21 during its movement a too small quantity of mineral wool is deposited above the compartment 29, here especially studied as an example. The consequence is that the air resistance through the part of the mineral wool mat existing above the compartment 29 is too low, and the major part of the available vacuum from the suction blower will therefore be consumed as pressure drop in the damper 80 and in the conduits to the compartment 29, whereas only a very small part of the available pressure drop will be between the compartment 29 and the outer atmosphere. The pressure measured by means of the manometer 58 will therefore be too high, and as a consequence thereof the pointer 65 will move in counter-clockwise direction and form contact with the counter contact 66. A current is then closed through the pointer, the counter contact 66, the conductor 68 and the coil of the relay 70, due to which the contact 72 is closed. This is, however, at present without further action.

During the movement of the conveyor 21 the cam 74 will sooner or later get into the contact case 75 so as to influence the pulley 77 and provide a momentary closing of the contact 78. Thereby also momentarily two different circuits are closed, partly following a common way. The one circuit runs from the plus terminal of the net mains through the contact 78, the conductor 79, the contact 72 and the conductor 92 to the winding of the magnet 91″, which is magnetized and momentarily attracts the armature 90″. Thereby the step hook 85″ is, against the action of the spring 89″, momentarily brought out of contact with the step wheel 84″, so that the blocking of the damper against turning movement shall not remain. The second circuit runs initially the same way but is divided from the conductor 92 to the winding of the suction magnet 87′, which thereby momentarily attracts its armature 86′ against the action of the spring 89′ and thus turns the step wheel 84′ together with all of the parts mechanically connected to this wheel one step in clock-wise direction. It is then seen that the damper 80 will be opened a little more causing a greater suction air feed through the conduits from the compartment 29. This in its turn causes a greater quantity of mineral wool to be deposited above this compartment, and the manometric pressure in the compartment will decrease.

If now, after this control of the damper 80 and possibly also of other dampers, the manometers of which have marked a need for a change of control, the correct weight of mineral wool should be deposited above the compartment 29, then no further change will take place for controlling the setting of the damper, as long as the manometer instrument 58 does not mark the need of a change. Such change may, however, be assumed to be required after only a little while, if for instance essential changes of setting have taken place at other dampers, so that the total balance of suction air between the different compartments has been upset. In such a case the just described action will be repeated, dependent upon the circumstances during increase or decrease of the opening of the damper.

If, on the other side, the increase of the opening of the damper thus caused should not prove to be sufficient, then contact will still exist between the pointer 65 of the manometer and the counter contact 66. When next time a cam 74 comes into touch with the pulley 77, the contact 78 is again momentarily closed, and in the same way as described above the step hook work of the damper 80 will be displaced one step further in the direction of a greater opening. In this way the action will continue, until all of the dampers have been set in such a position that the current resistance through the mat of mineral wool as formed after the change of the setting, counted pro unit of area, is equal above all of the compartments, which means the same as that the mat will obtain uniform tightness and volume weight across all of its width.

If, for one reason or another, a change of state should occur, then this will immediately be indicated by the manometer instruments, and a corresponding change of the setting of one or more dampers will take place, until a state of balance has been restored.

The invention is, of course, not limited to the specific form of execution, which has been described above in detail, or shown in the drawings, respectively, but different modifications may occur within the frame of the invention. It has already been mentioned that determining the thickness and the weight pro unit of area of different parts of the deposited mineral wool mat by measuring the pressure drop during the streaming of suction air through the mat is a specifically advantageous method, but that also other methods may be used in connection with the invention. But also in other respects the arrangement may be modified. Thus, it is not essential for the invention how many partitions are provided under the mat. Nor is it of decisive importance, where the suction air conduit is connected to the compartments, even if it has proved in practical tests that the openings 51 and 57′ to the two border compartments should suitably be situated rather in the beginning of the movement of the mat above these compartments, whereas the openings 52–56 can be provided at the end of the part of the collector case thus supervised.

What is claimed is:

1. In apparatus for forming a fiber mat by drawing air through an air permeable conveyor band to collect fibers on the band, thus forming a fiber mat deposit on the band, the improvement comprising distribution means for controlling the distribution of fiber deposit across the width of the band, said distribution means comprising a plurality of parallel, laterally adjacent, longitudinal suction chambers extending longitudinally at least part of the length of said band adjacent one side of said band, each of said chambers respectively being in communication with said band along the portion of the width of said band adjacent the respective chamber for drawing air through that portion of the band into the chamber, suction means for communicating with each respective chamber for removing air from said chamber, means for separately controlling the amount of air drawn by said suction means from each chamber wherein said means for controlling the amount of air drawn from each chamber comprises means for adjustably restricting the opening for communication between each chamber and its corresponding suction means, and separate means for each chamber for controlling the adjustment of the restricting means in each chamber, said separate means comprising motor means drivingly connected to the restricting means for adjusting said restricting means, sensing means for sensing change in condition of the fiber deposited on that portion of the band adjacent the respective chamber, and automatic means controlled by said sensing means for actuating said motor means in response to change in condition sensed by said sensing means.

2. The improvement of claim 1 in which said sensing means is sensitive to change in weight of the fiber deposited on said portion of the band.

3. The improvement of claim 1 in which said sensing means is sensitive to change in thickness of the fiber deposit on said portion of the band.

4. The improvement of claim 1 in which said sensing means is sensitive to change in pressure drop across said portion of the band.

5. The improvement of claim 4 in which said sensing means comprises manometer means for measuring the pressure drop across said portion of the band.

6. The improvement of claim 5 in which said automatic means for actuating the motor means is controlled by electric switches connected with said manometer means so that the switches are opened and closed by said manometer means according to the pressure drop measurement of the manometer means.

7. The improvement of claim 1 in which the automatic means for actuating the motor means comprises a pulse generator which, in response to signals from said sensing means, transmits power to said motor means in successive timed pulses for successive stepwise actuation of said motor means.

8. The improvement of claim 7 in which the timing of the pulse generator is synchronized with longitudinal movement of the band to provide time enough after each successive pulse to permit a consequent change in condition of the fiber deposit on the band before the next successive pulse.

9. The improvement of claim 7 in which said means for adjustably restricting the opening for communication in each respective chamber comprises a rotably adjustable damper, said motor means comprises a step-hook and wheel mechanism rotating said damper, and means driven by the power pulse from said motor-actuating means for moving the step-hook and wheel mechanism one step at each pulse for stepwise adjustment of the damper.

References Cited in the file of this patent

UNITED STATES PATENTS

| | | |
|---|---|---|
| 2,460,899 | Modigliani et al. | Feb. 8, 1949 |
| 2,569,765 | Kellett et al. | Oct. 2, 1951 |
| 2,698,271 | Clark | Dec. 28, 1954 |
| 2,890,497 | Langdon et al. | June 16, 1959 |
| 2,912,723 | Roberts | Nov. 17, 1959 |